United States Patent
Chen et al.

(10) Patent No.: US 9,207,732 B1
(45) Date of Patent: Dec. 8, 2015

(54) OPTIMIZED FAN DUTY CONTROL FOR COMPUTING DEVICE

(71) Applicant: Quanta Computer Inc., Guishan Dist., Taoyuan (TW)

(72) Inventors: Chao-Jung Chen, Taoyuan (TW); Yi-Chieh Chen, Taoyuan (TW)

(73) Assignee: Quanta Computer Inc., Taoyuan (TW)

( * ) Notice: Subject to any disclaimer, the term of this patent is extended or adjusted under 35 U.S.C. 154(b) by 0 days.

(21) Appl. No.: 14/630,682

(22) Filed: Feb. 25, 2015

(51) Int. Cl.
  *G05B 11/28* (2006.01)
  *G06F 1/20* (2006.01)

(52) U.S. Cl.
  CPC .................... *G06F 1/206* (2013.01)

(58) Field of Classification Search
  CPC .................. G06F 15/177; G06F 1/26
  USPC ......... 318/400.01, 400.11, 400.12, 400.14, 318/700, 701, 727, 799, 800, 471, 472, 318/599; 310/40.5, 62, 63; 700/300, 153, 700/205, 299; 713/2; 361/679.48, 695; 702/99, 130, 131
  See application file for complete search history.

(56) References Cited

U.S. PATENT DOCUMENTS

| | | | |
|---|---|---|---|
| 6,935,130 B2 | 8/2005 | Cheng et al. | |
| 7,043,647 B2 | 5/2006 | Hansen et al. | |
| 7,098,617 B1 * | 8/2006 | Oljaca et al. | 318/268 |
| 7,211,977 B2 | 5/2007 | Squibb | |
| 7,283,733 B2 | 10/2007 | Chiu et al. | |
| 7,489,975 B2 | 2/2009 | Motomiya et al. | |
| 7,863,880 B1 | 1/2011 | Sutardja et al. | |
| 8,055,392 B2 * | 11/2011 | Kitamura et al. | 700/300 |
| 8,219,248 B2 | 7/2012 | Aridome et al. | |
| 8,237,386 B2 * | 8/2012 | Culbert et al. | 318/471 |
| 8,237,387 B2 | 8/2012 | Tan | |
| 8,378,614 B2 | 2/2013 | Hou | |
| 8,489,250 B2 * | 7/2013 | Aklilu et al. | 700/300 |
| 8,812,831 B2 * | 8/2014 | Cheng et al. | 713/2 |
| 8,963,465 B2 * | 2/2015 | Chiu et al. | 318/452 |
| 2009/0206842 A1 | 8/2009 | Vaidyanathan et al. | |
| 2011/0077796 A1 * | 3/2011 | Aklilu et al. | 700/300 |
| 2011/0228471 A1 * | 9/2011 | Humphrey et al. | 361/679.48 |
| 2012/0084551 A1 * | 4/2012 | Cheng et al. | 713/2 |
| 2013/0084192 A1 | 4/2013 | Lee | |
| 2014/0036443 A1 * | 2/2014 | Xu et al. | 361/695 |
| 2014/0086746 A1 | 3/2014 | Tian et al. | |

OTHER PUBLICATIONS

Bai, "Using an Embedded Controller with Fuzzy Logic to Reduce Power Consumption of Mobile Computers", Retrieved from: http://cs.ee.fju.edu.tw/paper/201011.pdf (2010): 230-23.

* cited by examiner

*Primary Examiner* — Antony M Paul
(74) *Attorney, Agent, or Firm* — Novak Druce Connolly Bove + Quigg LLP

(57) ABSTRACT

Embodiments generally relate to thermal management in a computing device. The present technology discloses techniques that can enable an effective and reliable control of a fan speed using various factors such as a power loading value provided by a power supply unit. Power loading values can indicate a level of current flowing through the device, which is generally proportional to the amount of heat dissipated by such device.

21 Claims, 7 Drawing Sheets

| System Total Loading (W) | Fan Duty (%) |
|---|---|
| 200 ~ 400 | 30 |
| 400 ~ 600 | 50 |
| 600 ~ 800 | 70 |
| 800 ~ 1000 | 90 |
| >1000 | 100 |

FIG. 4

OPTIMIZED FAN DUTY CONTROL FOR COMPUTING DEVICE

FIELD OF THE INVENTION

The disclosure relates generally to thermal management in a computing device.

BACKGROUND

Computing devices such as personal computers, servers and network devices are the backbone of information technology systems. The increased density of computing devices (e.g., in a computer cluster) consumes more power and generates more heat. Thus, thermal management becomes critical for maintaining reliability of the computing devices.

Cooling fans have been used to lower a computing device's internal temperature by exhausting hot air from its chassis. Compared with other cooling methods such as liquid cooling, cooling fans are effective and easy to maintain. However, an effective control of the cooling fan speed is required to keep the internal temperature of a computing device within a preferred range. For example, an insufficiently low fan speed results in poor air circulation and overheating of the computing device; conversely, an unnecessarily high fan speed causes overcooling of the device and a waste of energy.

SUMMARY

The present technology provides an effective and reliable control of a fan duty using factors such as a power loading value provided by a power supply unit. A fan duty is the volume of air to be moved by fan at a specified total pressure (Pt). A fan duty may be, for example, measured in percentage (%). The present technology can regulate a fan duty to change a fan speed as a fan duty is linearly proportional to a fan speed. For example, a fan duty ranges from 0% to 100%, corresponding to a fan speed varying from a minimum speed to a maximum speed. A power loading value can indicate a level of current flowing through the device, which is proportional to the amount of heat dissipated by such device. By adjusting a fan duty corresponding to the power loading value, the present technology can maintain the computing device within a predetermined temperature range to avoid overheating or overcooling of the computing device.

According to some embodiments, the present technology may use a service controller (e.g., a baseband management controller) to determine a fan duty based at least on a power loading value. According to some embodiments, a power loading value, or power loading data, can be provided by the power meter of a power supply unit.

According to some embodiments, the present technology can determine a fan duty based on other factors, such as temperature and history of heat dissipation, in addition to the power loading value. One or more temperature sensors (e.g., thermal diode temperature sensors) can monitor one or more temperatures of the computing device. Additionally, the heat dissipation history of a computing device (e.g., a previous heat pattern of the computing device over a selected period of time) can be used to estimate peak hours of heat dissipation and increase the fan duty accordingly during the peak hours.

According to some embodiments, the present technology can utilize different fan control methods to control the fan duty. Examples of the fan control methods include linear voltage regulation, pulse width modulation (PWM), and software control.

Furthermore, the present technology can divide multiple fans into several thermal zones that are each associated with a separate fan duty. For example, computer fans in thermal zone #1 can operate at one fan duty, and computer fans in thermal zone #2 can operate at another fan duty.

Additionally, even though the present discussion uses fan duty control as an example of to enable cooling in the computing device, the present technology is conceptually applicable to other cooling methods, e.g., flow speed control in liquid cooling, or other cooling device control.

Additional features and advantages of the disclosure will be set forth in the description which follows, and, in part, will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

BRIEF DESCRIPTION OF THE DRAWINGS

Various embodiments or examples ("examples") of the invention are disclosed in the following detailed description and the accompanying drawings:

FIG. 4 is a chart illustrating a correlation between a system power loading value and a fan duty, according to some embodiments;

DETAILED DESCRIPTION

Figure 1:
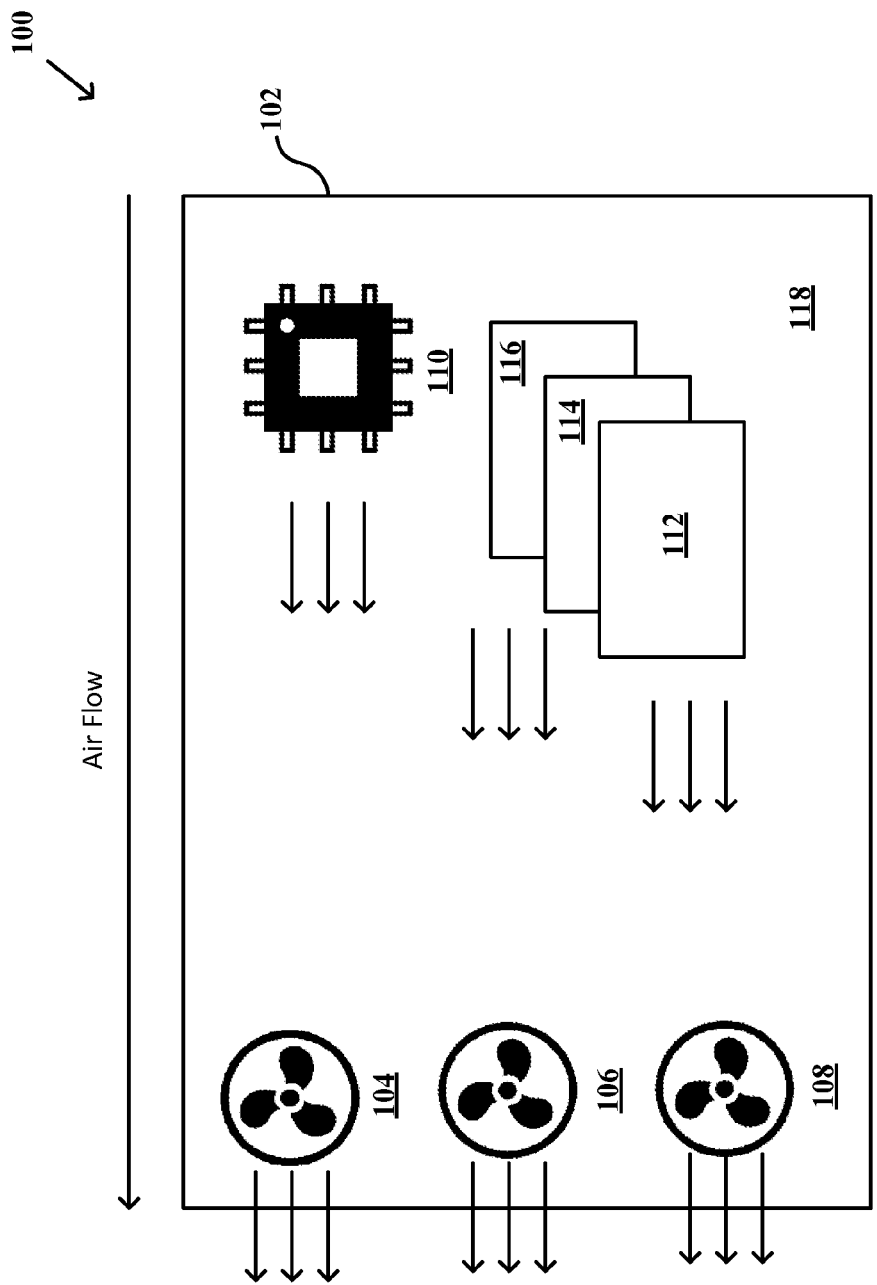
FIG. 1 illustrates an example of the fan duty control system, according to some embodiments.

Various embodiments of the present technology are discussed in detail below. While specific implementations are discussed, it should be understood that this is done for illustration purposes only. A person skilled in the relevant art will recognize that other components and configurations may be used without departing from the spirit and scope of the present technology.

A computing device is comprised of many heat-generating components such as CPUs, GPUs, chipset, and hard disks. As computing devices become more powerful and consume more energy, more heat is generated, particularly around the CPU or the hard disks. Excessive heat in the computing device can cause not only system malfunctions, but also physical damages to the computing components.

Cooling fans with variable fan speeds can blow colder air into a chassis, thus exhausting excessive heat from the chassis and lowering the temperature of computing devices in the chassis. Conventionally, a cooling fan's speed is linearly proportional to measured temperatures of heat-generating components such as a CPU. For example, a CPU with a high temperature requires the high speed of a cooling fan to remove the accumulated hot air.

However, solely using the temperature to determine a fan speed has several drawbacks. First, the delay in time from initial detection of a demonstrated high temperature to the gradual lowering of the temperature can be long enough to cause system malfunctions. Second, a less-intelligent computing device, such as a JBOD (traditionally called "Just a Bunch of Disks") or a switch, has few or zero internal temperature sensors, rendering it difficult to properly adjust a fan's duty by an internal temperature.

For example, the hard disks of a JBOD are usually not monitored by temperature sensors (e.g., thermal diode temperature sensors). Instead, a JBOD system solely uses an ambient temperature reading to determine a JBOD's cooling fan speed. As the ambient temperature reading fails to indicate the hard disks' actual temperature, it can result in either overcooling or overheating of the hard disks.

Thus, there is a need to provide an effective control of the cooling fan to optimize the thermal management of a computing device.

The present technology discloses techniques that can enable an effective and reliable control of the fan speed using at least a power loading value provided by a power supply unit. Power loading values, or power loading data, can indicate a level of current flowing through the device, which is generally proportional to the amount of heat dissipated by such device. According to some embodiments, a power meter of a power supply unit can provide power loading values.

According to some embodiments, utilizing at least a power loading value to determine a fan duty can eliminate the delay or latency in solely using temperature data to adjust a fan duty. This is because an increased power loading value usually happens before an increased temperature caused by the increased power. Additionally, utilizing a power loading value to determine a fan duty is particularly useful in a less-intelligent computing device that is equipped with few or zero temperature sensors, e.g., a JBOD.

According to some embodiments, the present technology can use a service controller (e.g., a baseband management controller) to determine a fan speed based at least on a power loading value. A baseboard management controller (BMC) is an independent and embedded microcontroller that, in some embodiments, is responsible for the management and monitoring of the main CPU, firmware and operating system. According to some embodiments, the BMC can monitor the server's hardware components by receiving data from sensors installed in the chassis, e.g., fan speeds, CPU temperature, power consumption level, etc.

According to some embodiments, besides the power loading value, the present technology can determine a fan speed based on other factors such as temperature, system power and history of heat dissipation. For example, one or more temperature sensors (e.g., thermal diode temperature sensors) can monitor a temperature of the computing device and that information can be used to determine the fan speed. For example, the heat dissipation history of the computing device including the past heat pattern over a selected period of time can be used to predict heat-dissipation peak hours for the computing device. Accordingly, the fan duty can be increased during the peak hours.

According to some embodiments, the present technology can utilize different fan control methods to control the fan speed. Examples of the fan control methods include linear voltage regulation, pulse width modulation (PWM), and software control.

Additional features and advantages of the disclosure will be set forth in the description which follows, and, in part, will be obvious from the description, or can be learned by practice of the herein disclosed principles. The features and advantages of the disclosure can be realized and obtained by means of the instruments and combinations particularly pointed out in the appended claims. These and other features of the disclosure will become more apparent from the following description and appended claims, or can be learned by the practice of the principles set forth herein.

FIG. 1 illustrates an example of a fan duty control system 100, according to some embodiments. Fan duty control system 100 can include a computing device 102 that includes the following: a chassis 118, one or more CPUs 110 that can generate a certain amount of heat, one or more other heat generating components including hard disks, GPUs, chipsets (e.g., 112, 114, and 116), and one or more cooling fans (e.g., 104, 106 and 108). Examples of the computing device 102 include the following: a server, a switch, a storage device (e.g., a JBOD), or a personal computer.

According to some embodiments, the one or more cooling fans (e.g., 104, 106 and 108) can actively exhaust hot air from chassis 118 in a front-to-back airflow, a side-to-side airflow, or a back-to-front airflow. In a front-to-back airflow as shown in FIG. 1, the one or more cooling fans (e.g., 104, 106 and 108) can pull hot air through chassis 118 to control the internal temperature within a predetermined range (e.g., 25° C. to 55° C.). The speed of pulling the hot air from chassis 118 can depend on a selected fan duty and its corresponding fan speed.

Still referring to FIG. 1, various fan control mechanisms can be used to adjust fan speeds based on several fan speed factors that indicate the heat accumulated in chassis 118. Typical fan control mechanisms include linear voltage regulation, pulse width modulation (PWM), and software controls that are well known to those of ordinary skill in the art. Examples of the fan speed factors include: one or more power loading values of computing device 102, one or more internal temperature readings of chassis 118, one or more ambient temperature readings, and a heat dissipation history of computing device 102.

For example, a high power loading value (e.g., in watts) indicates a high level of current flowing through one or more components, such as CPU 110 and/or other heat generating components such as 112, 114 and 116. As known in the art, a high level of current can result in a high amount of heat generated by computing device 112. Thus, based at least on a high power loading value, fan duty control system 100 can increase the fan duty of cooling fans (e.g., 104, 106 and 108) to control the internal temperature within a predetermined range (e.g., 25° C. to 55° C.).

According to some embodiments, a high internal temperature (e.g., a CPU die temperature, or a motherboard temperature) measured by a temperature sensor (e.g., a thermal diode temperature sensor) can indicate that a substantial amount of heat has accumulated in chassis 118. Thus, fan duty control system 100 can accordingly increase the fan duty of one or more cooling fans (e.g., 104, 106 and 108) to remove the accumulated heat.

According to some embodiments, a heat dissipation history of computing device 102 can be used to determine a fan duty of the one or more cooling fans (e.g., 104, 106 and 108). For instance, a power loading value record over a time period (e.g., the past 30 days) could indicate computing device 102 consumes 30% more power from 8:00 p.m. to 10:00 p.m. every day. Accordingly, cooling fan duty system 100 can increase the fan duty from 8:00 p.m. to 10:00 p.m. by a predetermined amount, with the expectation that more heat is generated in chassis 118 during these peak hours.

According to some embodiments, fan duty control system 100 can divide chassis 118 into one or more cooling zones (not shown) for more precise control of the fan duty. For example, a cooling zone with a higher internal temperature can have a fan duty higher than another cooling zone with a lower internal temperature. Additionally, the one or more cooling fans (e.g., 104, 106 and 108) can be divided into different fan groups according to a corresponding cooling zone. According to some embodiments, based on the one or more factors (e.g., a power loading value, a temperature) associated with a specific cooling zone, fan duty of the different fan groups can be different.

Figure 2:
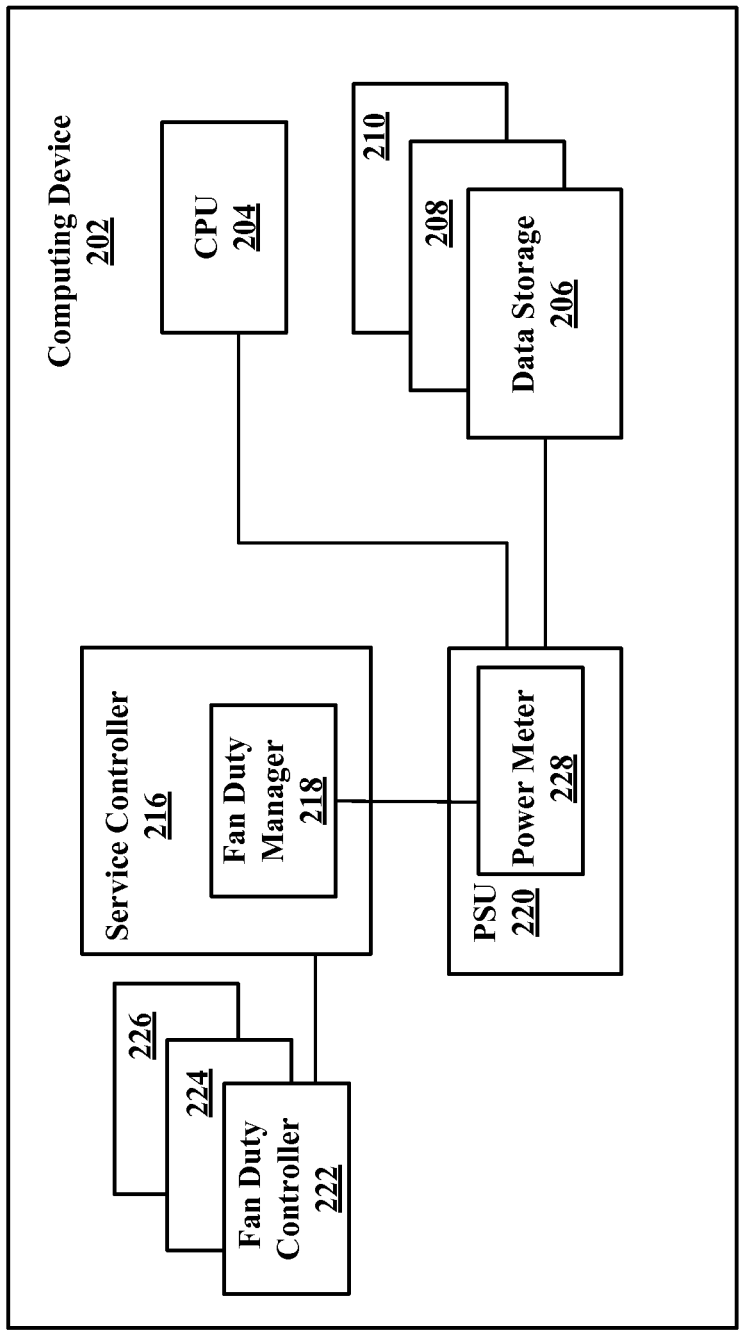
FIG. 2 is a block diagram illustrating an example of the fan duty control system, according to some embodiments.

FIG. 2 is a block diagram illustrating an example of a fan duty control system 200, according to some embodiments. As shown in FIG. 2, a computing device 202 can include the following: at least one CPU (e.g., 204), one or more data storage disks (e.g., 206, 208, or 210), a service controller 216 that can include a fan duty manager 218, a power supply unit 220 (PSU) that can include a power meter 228, and one or more fan duty controllers (e.g., 222, 224, or 226)—each of which can control a speed of a cooling fan (not shown).

According to some embodiments, service controller 216 can be an embedded and independent microprocessor that has an operating system (e.g., an IPMI-compliant OS) different from computing device 202 (e.g., LINUX). Service controller 216 can have a power supply separate from computing device 202. An example of service controller 216 is a baseboard management controller (BMC). According to some embodiments, service controller 216 can receive power loading data associated with one or more heat generating components (e.g., CPU 204, data storage 206, 208 or 210) from power meter 228 of PSU 220. Based on the power loading data, service controller 216 can, using fan duty manager 218, determine a fan duty for one or more cooling fans based on a predetermined relationship between a system loading value and a corresponding fan duty.

Additionally, the determined fan duty can correspond with a fan duty command generated by service controller 216. Examples of the fan duty command include a PWM signal, having a duty cycle that is proportional to a level of fan power (e.g., a low PWM duty cycle corresponds to a low fan power). Furthermore, service controller 216 can cause the one or more fans to operate at a fan speed corresponding to the fan duty by transmitting the fan duty command to fan duty controllers 222, 224, or 226. Furthermore, fan duty controllers 222, 224, or 226 can adjust the fan speed according to the fan duty level command.

According to some embodiments, fan duty controllers (e.g., 222, 224 and 226) can send fan speed tachometer signals to service controller 216 to provide fan speed feedback. The fan speed tachometer signals can indicate whether the cooling fan is running and its speed.

Figure 3:
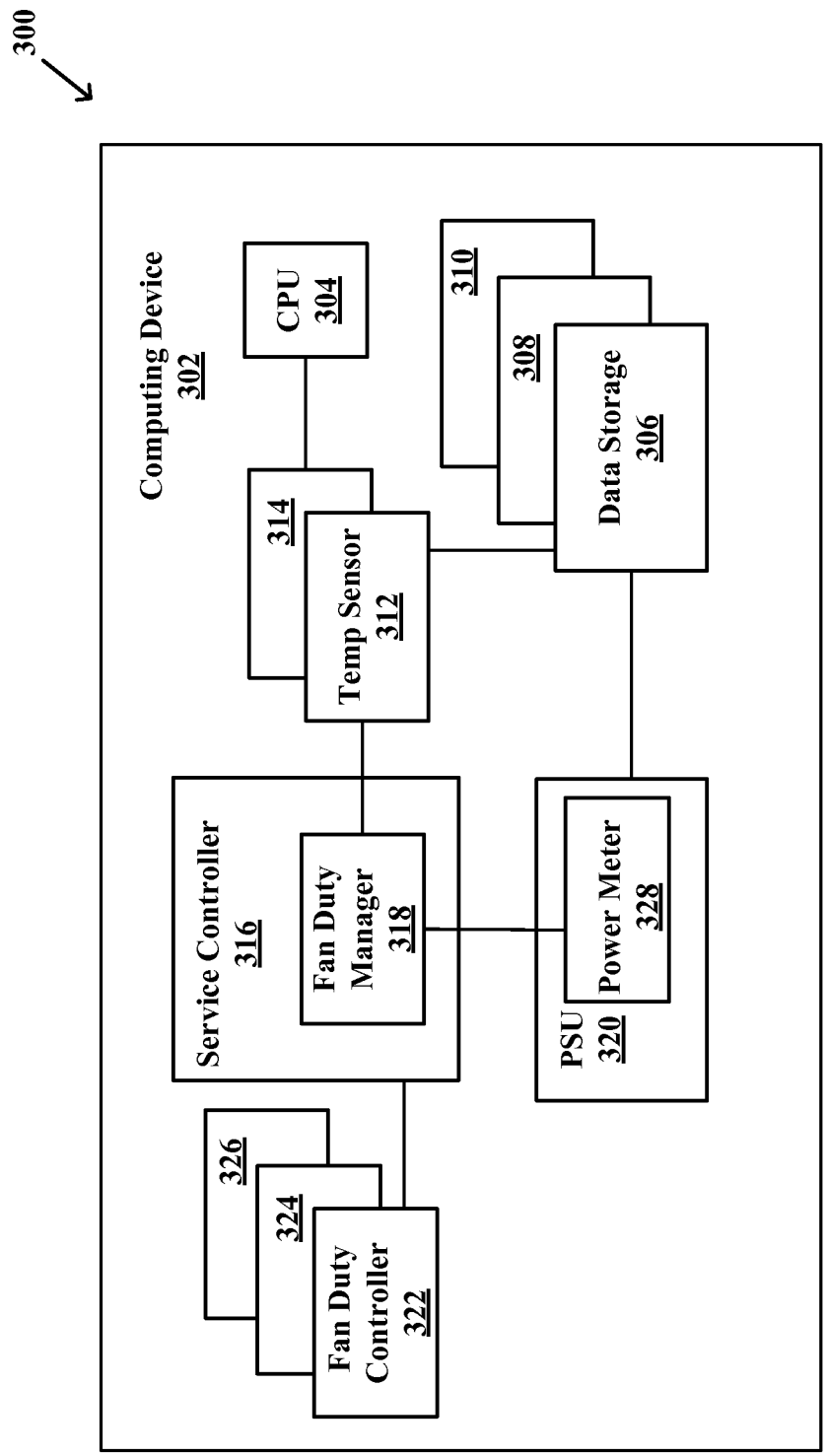
FIG. 3 is another block diagram illustrating another example of the fan duty control system, according to some embodiments.

According to some embodiments, utilizing power loading data to determine a fan duty can eliminate the delay or latency in relying solely on temperature to adjust a fan speed, because an increased power loading value usually happens before an increased temperature. Additionally, utilizing power loading data to determine a fan duty is particularly useful in a less-intelligent computing device that is equipped with few or zero temperature sensors. FIG. 3 is a block diagram illustrating another example of a fan duty control system 300, according to some embodiments. As shown in FIG. 3, a computing device 302 can include at least one CPU (e.g., 304), one or more data storage disks (e.g., 306, 308, or 310), a service controller 316 that can include a fan duty manager 318, a power supply unit 320 (PSU) that can include a power meter 328, one or more temperature sensors (e.g., 312 and 314), and one or more fan duty controllers (e.g., 322, 324, or 326), each of which can control a speed of a cooling fan (not shown).

According to some embodiments, service controller 316 (e.g., BMC) can receive at least one type of fan speed factor data associated with one or more heat generating components (e.g., CPU 304, data storage 306, 308 or 310). The type of fan speed factor data include power loading data provided by power meter 318 of PSU 320, temperature data provided by temperature sensor 312 or 314 (e.g., thermal diode temperature sensor), a heat dissipation history provided by a historical data storage (not shown), and other types of data that can be used to decide a fan speed. Based in part on one type of speed factor data, service controller 316 can, using fan duty manger 318, determine a fan duty for one or more cooling fans based on a multi-factor calculation for estimating a fan duty. Additionally, the fan duty can correspond with a fan duty command. Examples of the fan duty command include a PWM duty cycle that is proportional to a level of fan power (e.g., a low PWM duty cycle corresponds to a low fan power). Furthermore, service controller 316 can cause the one or more fans to operate at a fan speed corresponding to the fan duty by transmitting the fan duty command to fan duty controller 322, 324 or 326. Furthermore, fan duty controller 322, 324 or 326 can adjust the fan speed according to the fan duty command.

According to some embodiments, depending on the function of temperature sensor 312 or 314, temperature data can be a CPU die temperature, an internal chassis temperature or an ambient temperature.

FIG. 4 is a chart illustrating a relationship between a system total loading measured in watts and a fan duty measured in percentage, according to some embodiments. As shown in FIG. 4, a system total loading is substantially linear to a fan duty. For example, a system total loading of 200-400 watts requires a fan duty of about 30% to maintain a temperature within a predetermined range (e.g., 25° C. to 55° C.). A system total loading of 400-600 watts requires a fan duty of about 50%, while a system total loading of 600-800 watts requires a fan duty of about 70%, a system total loading of 800-1000 watts requires a fan duty of about 90%, and a system total loading of more than 1000 watts requires a fan duty of about 100%. Other correlations or calculation models that consider one or more fan speed factors can be used to determine a fan duty.

Figure 5:
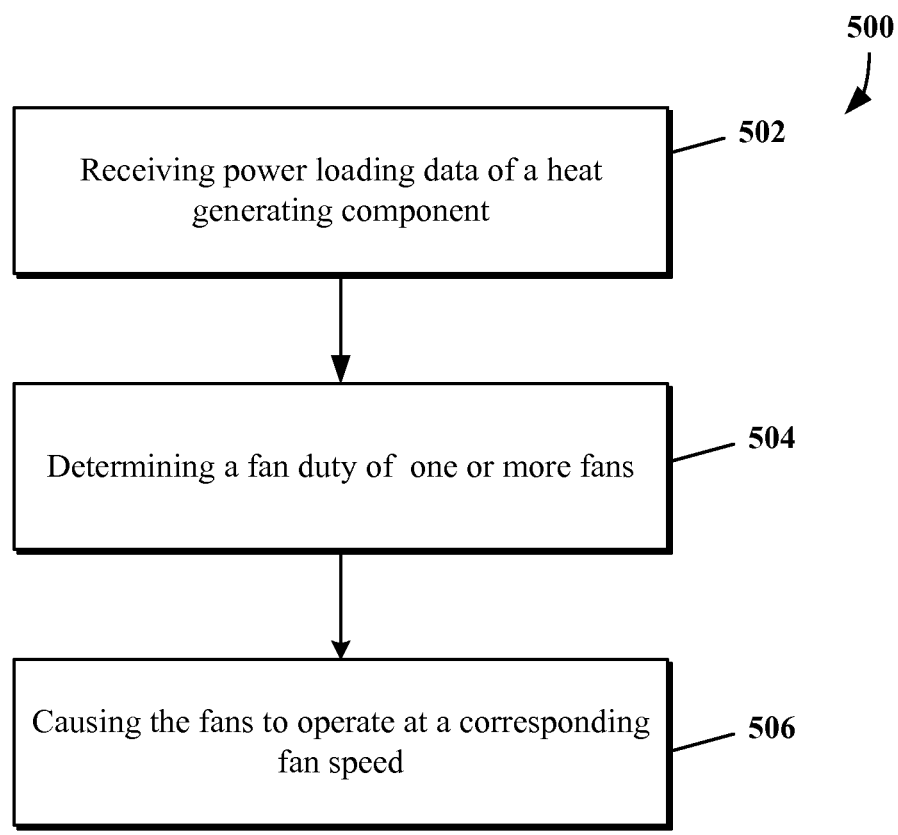
FIG. 5 is an example flow diagram for the fan control system, according to some embodiments.

FIG. 5 is an example flow diagram 500 for a fan duty control system, according to some embodiments. It should be understood that there can be additional, fewer, or alternative steps performed in similar or alternative orders, or in parallel, within the scope of the various embodiments unless otherwise stated. At step 502, a service controller can receive power loading data associated with a heat generating component. For example, the power loading data can be provided by a power meter of a power supply unit.

At step 504, the service controller can determine, based at least in part on the power loading data, a fan duty associated with one or more fans. For example, a power loading value can relate to a corresponding fan duty based on a predetermined linear relationship (e.g., a power loading data of 400-600 watts requires a fan duty of about 50%).

At step 506, the service controller can cause the one or more fans to operate at a fan speed corresponding to the fan duty. For example, after determining the fan duty, the service control can transmit a fan duty command to at least one fan duty controller associated with the one or more fans, the fan duty command being configured to indicate the fan duty. According to some embodiments, the fan duty command can be a PWM signal having a duty cycle that is proportional to a fan duty. (e.g., a high PWM duty cycle corresponds to a high fan duty level).

Figure 6:
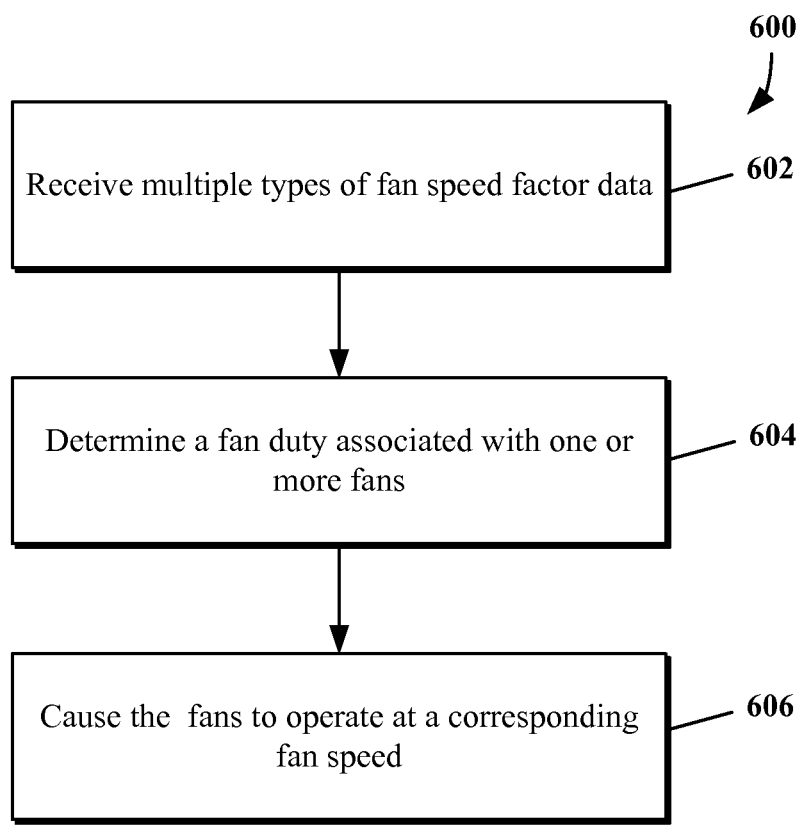
FIG. 6 is another example flow diagram for the fan control system, according to some embodiments.

FIG. 6 is another example flow diagram 600 for a fan duty control system, according to some embodiments. It should be understood that there can be additional, fewer, or alternative steps performed in similar or alternative orders, or in parallel, within the scope of the various embodiments unless otherwise stated. At step 602, a service controller can receive several types of fan speed factor data associated with multiple heat generating components. For example, fan speed factor data comprises at least one of power loading data provided by a power supply unit, temperature data provided by one or more temperature sensors, or a heat dissipation history provided by a storage medium.

At step 604, the service controller can, based at least in part on the one or more types of fan speed factor data, determine a fan duty associated with one or more fans. For example, a power loading value can relate to a corresponding fan duty based on a predetermined linear relationship (e.g., a power loading data of 400-600 watts requires a fan duty of about 50%).

At step 606, the service controller can cause the fans to operate at a fan speed corresponding to the fan duty. For example, after determining the fan duty, the service controller can transmit a fan duty command to one fan duty controller associated with the fans, the fan duty command being configured to indicate the fan duty level. According to some embodiments, the fan duty command can be a PWM having a duty cycle that is proportional to a fan duty. (e.g., a high PWM duty cycle corresponds to a high fan duty level). Additionally, according to some embodiments, each of the one or more fans is located in one or more cooling zones of the computing device, wherein each of the zones is configured to associate with an individual fan duty.

Figure 7:
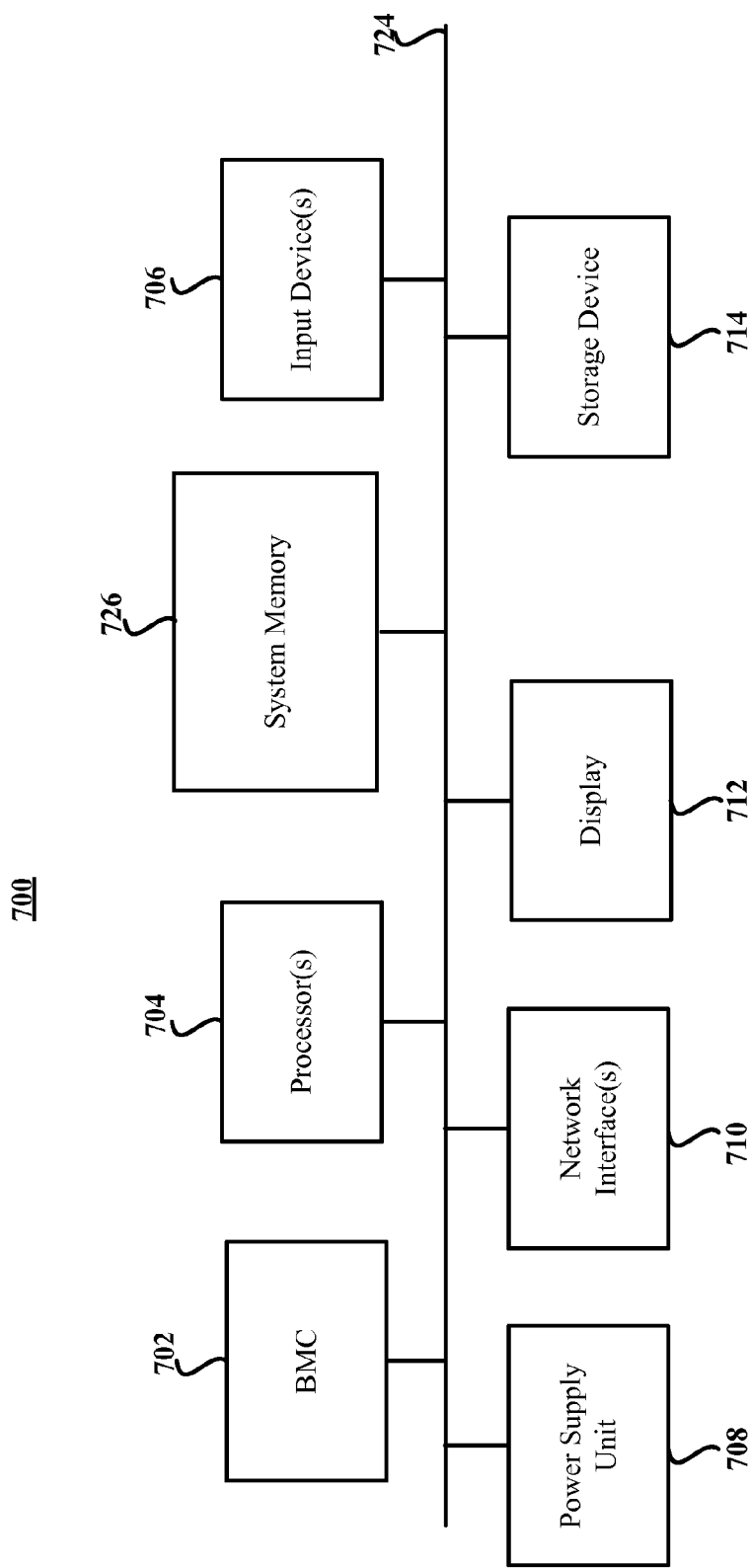
FIG. 7 illustrates an computing platform of a computing device, according to some embodiments.

FIG. 7 illustrates an example system architecture 700 for implementing the systems and processes of FIGS. 1-6. Computing platform 700 includes a bus 724 which interconnects subsystems and devices, such as: service controller 702, processor 704, storage device 714, system memory 726, a network interface(s) 710, and a power supply unit 708. Processor 704 can be implemented with one or more central processing units ("CPUs"), such as those manufactured by Intel® Corporation—or one or more virtual processors—as well as any combination of CPUs and virtual processors. Computing platform 700 exchanges data representing inputs and outputs via input-and-output devices input devices 706 and display 712, including, but not limited to: keyboards, mice, audio inputs (e.g., speech-to-text devices), user interfaces, displays, monitors, cursors, touch-sensitive displays, LCD or LED displays, and other I/O-related devices.

According to some examples, computing architecture 700 performs specific operations by processor 704, executing one or more sequences of one or more instructions stored in system memory 726. Computing platform 700 can be implemented as a server device or client device in a client-server arrangement, peer-to-peer arrangement, or as any mobile computing device, including smart phones and the like. Such instructions or data may be read into system memory 726 from another computer readable medium, such as storage device 714. In some examples, hard-wired circuitry may be used in place of or in combination with software instructions for implementation. Instructions may be embedded in software or firmware. The term "computer readable medium" refers to any tangible medium that participates in providing instructions to processor 704 for execution. Such a medium may take many forms, including, but not limited to, non-volatile media and volatile media. Non-volatile media includes, for example, optical or magnetic disks and the like. Volatile media includes dynamic memory, such as system memory 726.

Common forms of computer readable media includes, for example: floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read. Instructions may further be transmitted or received using a transmission medium. The term "transmission medium" may include any tangible or intangible medium that is capable of storing, encoding or carrying instructions for execution by the machine, and includes digital or analog communications signals or other intangible medium to facilitate communication of such instructions. Transmission media includes coaxial cables, copper wire, and fiber optics, including wires that comprise bus 724 for transmitting a computer data signal.

In the example shown, system memory 726 can include various modules that include executable instructions to implement functionalities described herein. In the example shown, system memory 726 includes a log manager, a log buffer, or a log repository—each can be configured to provide one or more functions described herein.

Although the foregoing examples have been described in some detail for purposes of clarity of understanding, the above-described inventive techniques are not limited to the details provided. There are many alternative ways of implementing the above-described invention techniques. The disclosed examples are illustrative and not restrictive.

What is claimed is:

1. A method, comprising:
   receiving, at a service controller of a computing device, power loading data associated with at least one heat generating component of the computing device;
   determining a specific system loading range based at least in part on the power loading data;
   determining, based at least in part on the specific system loading range, a predetermined fan duty associated with one or more fans, the predetermined fan duty corresponding to the specific system loading range; and
   causing the one or more fans to operate at a fan speed corresponding to the fan duty.

2. The method of claim 1, further comprising:
   transmitting a fan duty command to at least one fan duty controller associated with the one or more fans, the fan duty command indicating the fan duty.

3. The method of claim 1, wherein the power loading data is provided by a power meter associated with a power supply unit that supplies power to the at least one heat generating component.

4. The method of claim 1, wherein the power loading data is linearly proportional to the fan duty, and the fan duty is linearly proportional to the fan speed.

5. The method of claim 1, wherein each of the one or more fans is located in a cooling zone of one or more cooling zones of the computing device, and wherein the each of the one or more fans operates at a fan duty that is associated with the cooling zone of the one or more cooling zones.

6. The method of claim 1, wherein a fan duty manager associated with the service controller operates to determine, based at least in part on the power loading data, the fan duty associated with the one or more fans.

7. The computer-implemented method of claim 1, wherein the service controller is independent from a main CPU of the computing device.

8. The method of claim 1, wherein the specific system loading range is one of a plurality of system loading ranges, each of the plurality of system loading ranges corresponding to a respective predetermined fan duty.

9. A system, comprising:
a processor; and
a memory device including instructions that, when executed by the processor, cause the system to:
receive, at a service controller of a computing device, one or more types of fan speed factor data associated with at least one heat generating component of the computing device, the one or more types of fan speed factor data including power loading data provided by a power supply unit and heat dissipation history data provided by a storage medium;
determining a specific system loading range based at least in part on the power loading data;
determine, based at least in part on the specific system loading range and the heat dissipation history data, a fan duty associated with one or more fans; and
cause the one or more fans to operate at a fan speed corresponding to the fan duty.

10. The system of claim 9, wherein the one or more types of fan speed factor data further comprises temperature data provided by one or more temperature sensors.

11. The system of claim 9, wherein the power loading data is linearly proportional to the fan duty, and the fan duty is linearly proportional to the fan speed.

12. The system of claim 9, further comprising instructions that, when executed by the processor, cause the system to:
transmit a fan duty command to at least one fan duty controller associated with the one or more fans, the fan duty command indicating the fan duty.

13. The system of claim 9, wherein each of the one or more fans is located in a cooling zone of one or more cooling zones of the computing device, and wherein the each of the one or more fans operates at a fan duty that is associated with the cooling zone of the one or more cooling zones.

14. The system of claim 9, wherein a fan duty manager associated with the service controller operates to determine, based at least in part on the one or more types of fan speed factor data, a fan duty associated with one or more fans.

15. The system of claim 9, wherein the service controller is a baseboard management controller that is independent from a main CPU of the computing device.

16. The system of claim 9, further comprising instructions that, when executed by the processor, cause the system to:
receive, at the service controller, one or more feedback signals provided by the one or more fans.

17. A non-transitory computer-readable storage medium storing instructions, the instructions when executed by a processor causing the processor to:
receive, at a service controller of a computing device, one or more types of fan speed factor data associated with at least one heat generating component of the computing device, the one or more types of fan speed factor data including power loading data provided by a power supply unit and heat dissipation history data provided by a storage medium;
determine a specific system loading range based at least in part on the power loading data;
determine, based at least in part on the specific system loading range and the heat dissipation history data, a fan duty, a fan duty associated with one or more fans; and
cause the one or more fans to operate at a fan speed corresponding to the fan duty.

18. The non-transitory computer-readable storage medium of claim 17, further comprising instructions, the instructions when executed by a processor causing the processor to:
receive, at the service controller, one or more feedback signals provided by the one or more fans.

19. The non-transitory computer-readable storage medium of claim 17, wherein the one or more types of fan speed factor data further comprises temperature data provided by one or more temperature sensors.

20. The non-transitory computer-readable storage medium of claim 17, wherein each of the one or more fans is located in a cooling zone of one or more cooling zones of the computing device, and wherein the each of the one or more cooling fans operates at a fan duty that is associated with the cooling zone of the one or more cooling zones.

21. The non-transitory computer-readable storage medium of claim 17, wherein the heat dissipation history data comprises at least one heat dissipation peak time for the computing device.

* * * * *